United States Patent
Milione et al.

(10) Patent No.: US 10,763,989 B2
(45) Date of Patent: Sep. 1, 2020

(54) MACHINE LEARNING BASED CLASSIFICATION OF HIGHER-ORDER SPATIAL MODES

(71) Applicant: NEC Laboratories America, Inc., Princeton, NJ (US)

(72) Inventors: Giovanni Milione, Franklin Square, NY (US); Philip Ji, Cranbury, NJ (US); Eric Cosatto, Red Bank, NJ (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 16/655,103

(22) Filed: Oct. 16, 2019

(65) Prior Publication Data

US 2020/0119830 A1    Apr. 16, 2020

Related U.S. Application Data

(60) Provisional application No. 62/746,140, filed on Oct. 16, 2018.

(51) Int. Cl.
| | |
|---|---|
| *H04B 10/00* | (2013.01) |
| *H04J 14/04* | (2006.01) |
| *G06N 3/02* | (2006.01) |
| *G06N 20/00* | (2019.01) |
| *G06K 9/62* | (2006.01) |
| *H04J 14/00* | (2006.01) |

(52) U.S. Cl.
CPC ............ *H04J 14/04* (2013.01); *G06K 9/6267* (2013.01); *G06N 3/02* (2013.01); *G06N 20/00* (2019.01)

(58) Field of Classification Search
CPC ............................. H04B 10/2581; H04J 14/04
See application file for complete search history.

(56) References Cited

U.S. PATENT DOCUMENTS

| | | | | |
|---|---|---|---|---|
| 2009/0262337 | A1* | 10/2009 | Nicholson | ............ G01N 21/412 356/73.1 |
| 2013/0173194 | A1* | 7/2013 | Dholakia | ............... G02B 27/58 702/71 |

(Continued)

*Primary Examiner* — Daniel G Dobson
(74) *Attorney, Agent, or Firm* — Joseph Kolodka (57) ABSTRACT

Aspects of the present disclosure describe systems, methods and structures for classification of higher-order spatial modes using machine learning systems and methods in which the classification of high-order spatial modes emitted from a multimode optical fiber does not require indirect measurement of the complex amplitude of a light beam's electric field using interferometry or, holographic techniques via unconventional optical devices/elements, which have prohibitive cost and efficacy; classification of high-order spatial modes emitted from a multimode optical fiber is not dependent on a light beam's alignment, size, wave front (e.g. curvature, etc.), polarization, or wavelength, which has prohibitive cost and efficacy; classification of higher-order spatial modes from a multimode optical fiber does not require a prohibitive amount of experimentally generated training examples, which, in turn, has prohibitive efficacy; and the light beam from a multimode optical fiber can be advantageously separated into two orthogonal polarization components, such that, the different linear combination of higher order spatial modes comprising each polarization component can be classified.

20 Claims, 7 Drawing Sheets

(56) References Cited

U.S. PATENT DOCUMENTS

2014/0098361 A1* 4/2014 Fini .................. G01M 11/331
                                                    356/73.1
2015/0292941 A1* 10/2015 Forbes ............... G01J 1/4228
                                                    356/121

* cited by examiner

MACHINE LEARNING BASED CLASSIFICATION OF HIGHER-ORDER SPATIAL MODES

CROSS REFERENCE TO RELATED APPLCIATIONS

This application claims the benefit of U.S. Provisional Patent Application Ser. No. 62/746,140 filed 16 Oct. 2019 the entire contents of which is incorporated by reference as if set forth at length herein.

TECHNICAL FIELD

This disclosure relates generally to optical communications and optical sensing systems, methods, and structures. More particularly, it describes the machine learning based classification of higher-order spatial modes.

BACKGROUND

As is known in the optical communications and optical sensing arts, spatial modes are mathematical functions that can be used to describe transverse (i.e., perpendicular to direction of propagation of a light beam) spatial dependence of the complex amplitude of the electric field of a light beam. These mathematical functions are solutions to an electromagnetic wave equation. For example, the light beam of a conventional laser pointer is a spatial mode that is referred to as the fundamental spatial mode, i.e., the lowest order solution to the wave equation.

Figure 1:
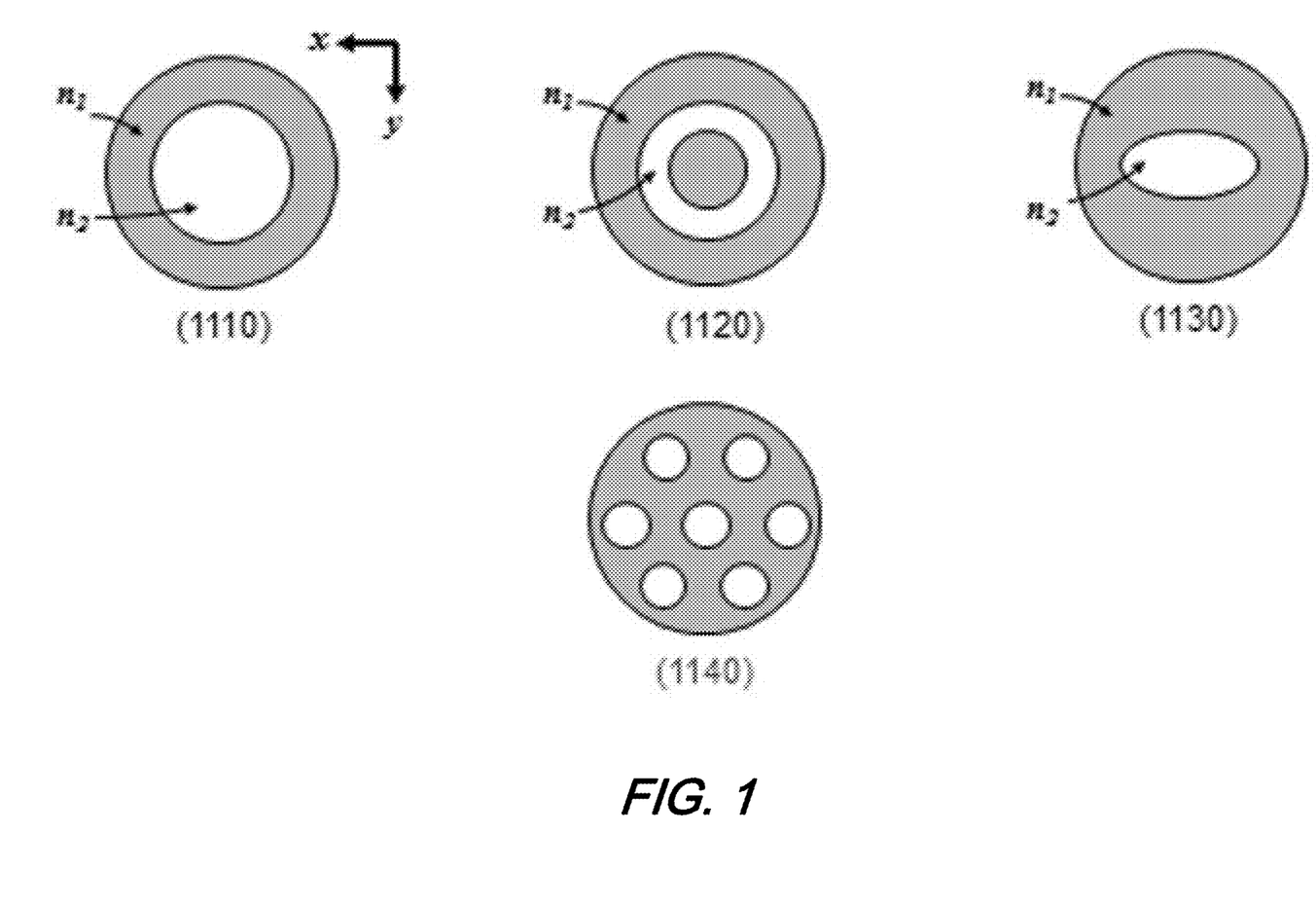
Figure 2A:
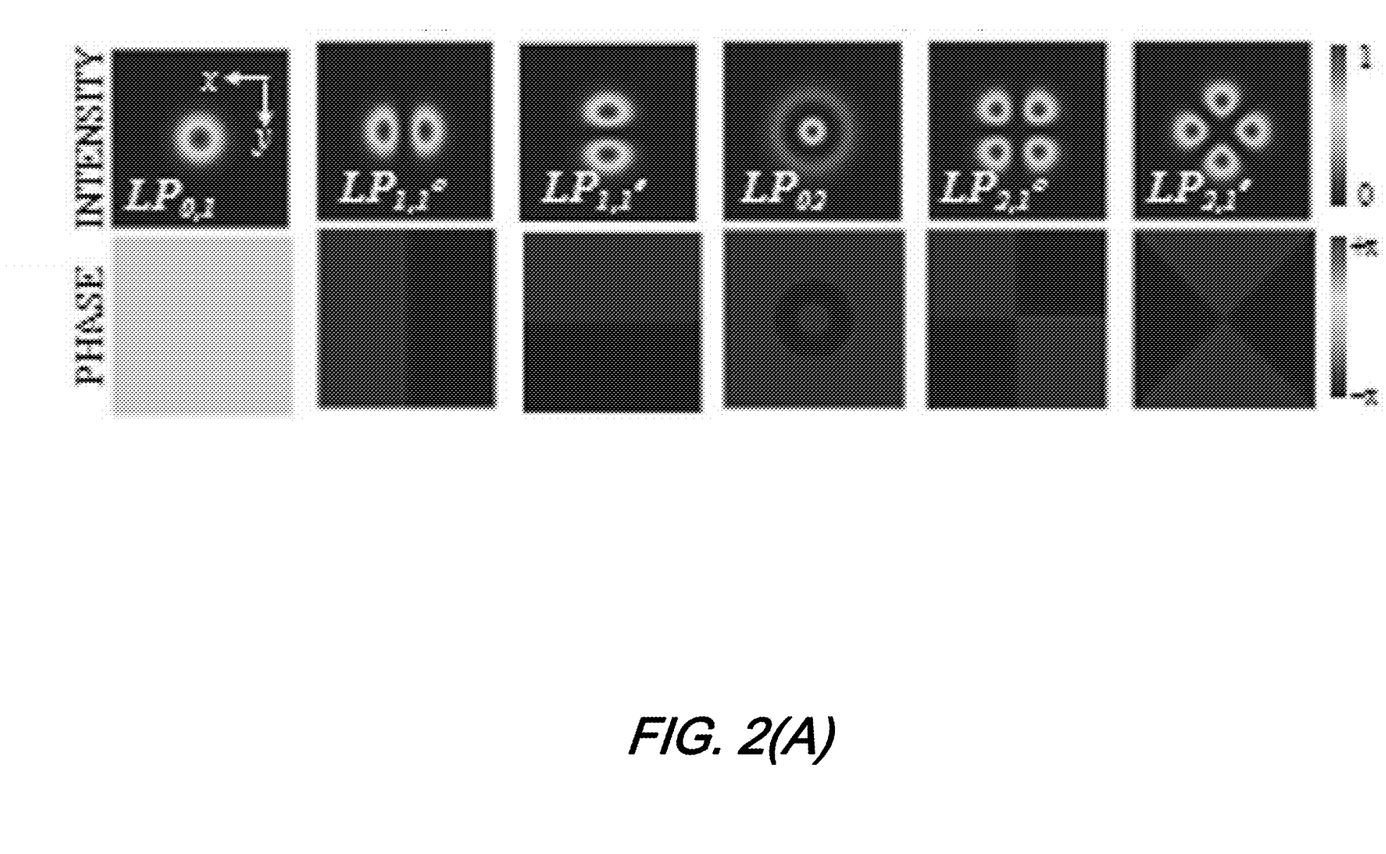
FIG. 2(A), FIG. 2(B), and FIG. 2(C) shows a series of higher order spatial modes for: intensity and phase according to aspects of the present disclosure.
Figure 2B:
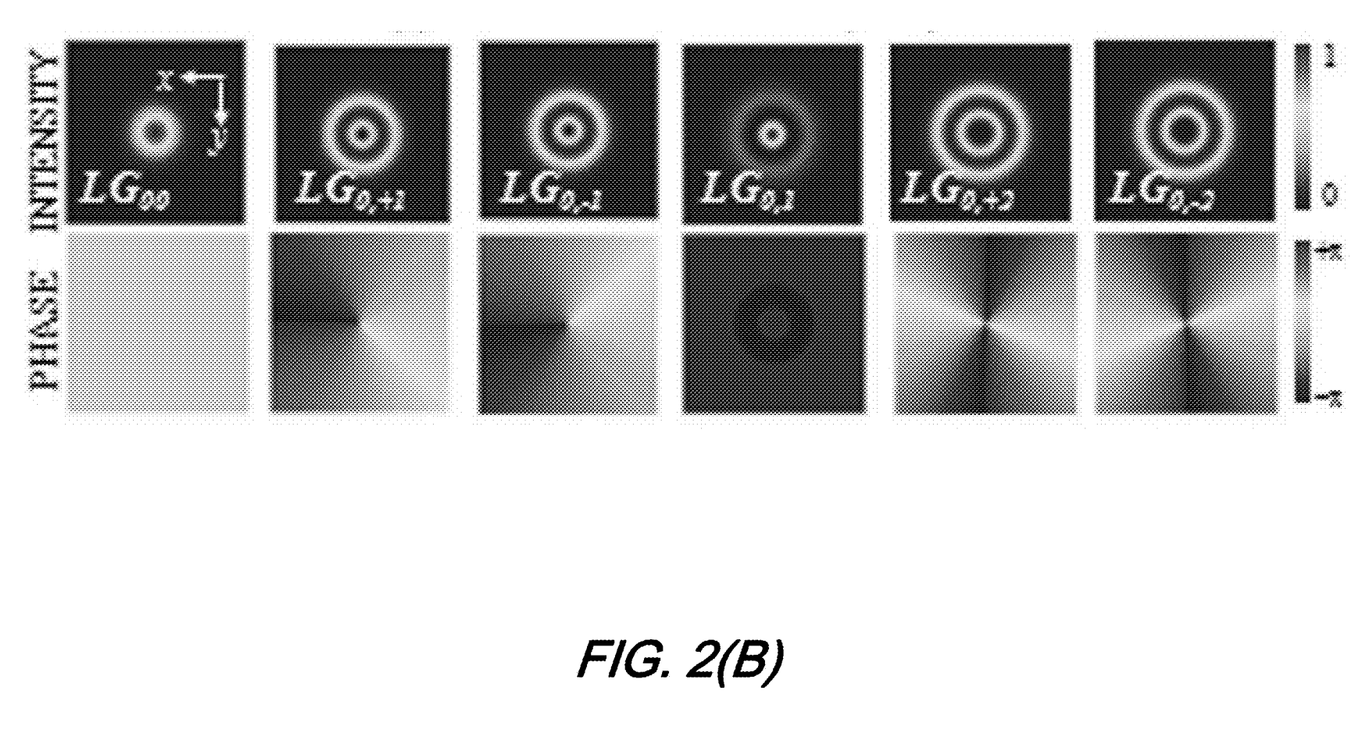
Figure 2C:
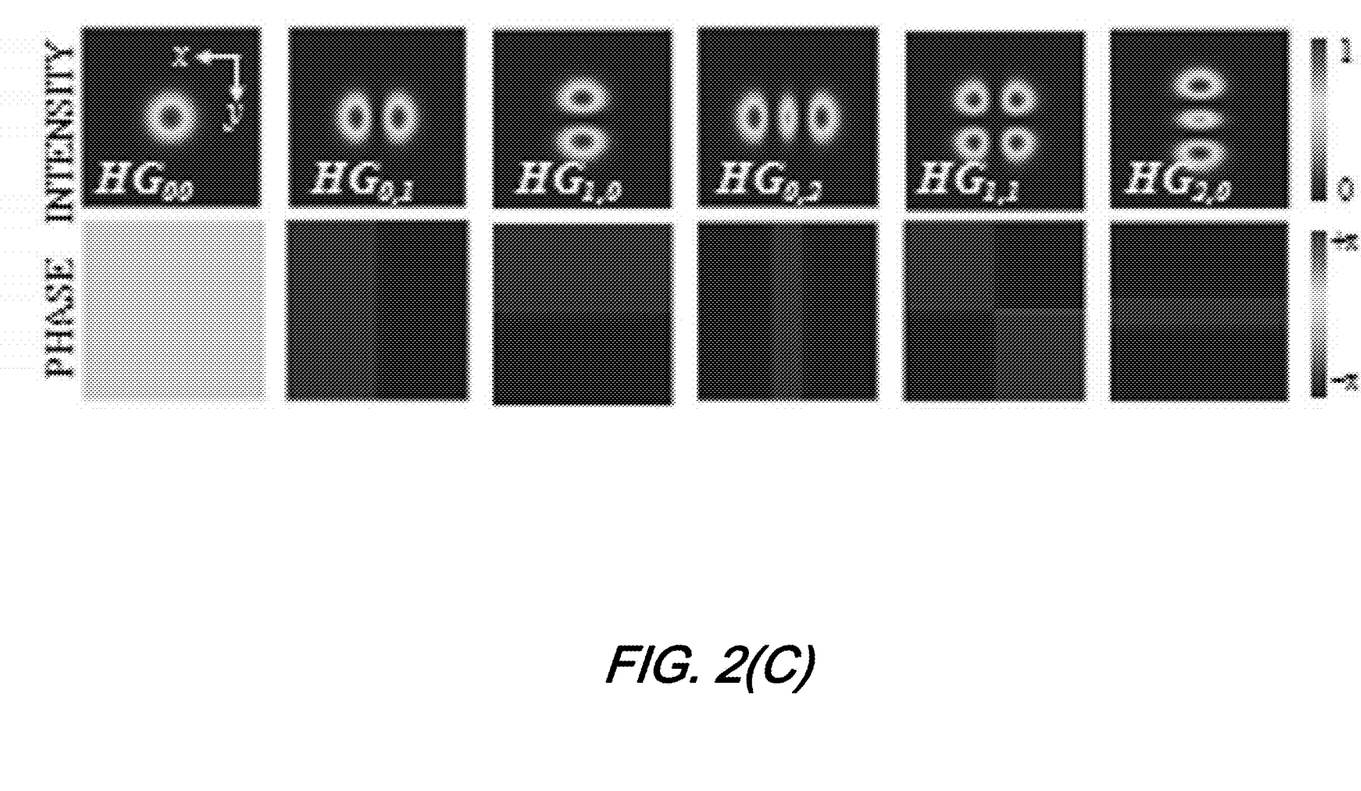

The spatial dependence of the intensity of the complex amplitude of the electric field of the fundamental spatial mode is characterized by being brightest at a light beam's center and, becoming gradually less bright farther from the beam's center. There are, however, high-order solutions to the wave equation, i.e., higher-order spatial modes. The complex electric field amplitudes of higher-order spatial modes have more complex spatial dependencies. For example, there are higher-order spatial modes referred to as Hermite-Gaussian modes (FIG. 2—top), and Laguerre-Gaussian modes (FIG. 2—bottom), which have ring-like and lobe-like spatial dependencies, respectively. Other higher-order spatial modes are Linearly Polarized modes and vector modes.

Higher-order spatial modes can propagate through free space (e.g. Earth's atmosphere, outer space) and waveguides (e.g. optical fibers). As a result, higher-order spatial modes are receiving significant interest in the communications and sensing arts.

For example, higher-order spatial modes can be used to increase the data speeds of free space and optical fiber communication at a given wavelength (i.e., spectral efficiency), where each higher-order spatial mode is used as a data state with which to encode data or, a channel over which data is encoded otherwise. Also, higher-order spatial modes can be used to enhance image resolution in microscopy, where image resolutions beyond wavelength dependent limits can be achieved via illumination with higher-order spatial modes (i.e., super-resolution).

For any spatial mode, its classification is often necessary, especially with respect to the applications noted above. For fundamental spatial modes, classification comprises characterization of the spatial modes' quality via the so-called $M^2$ factor, i.e., a product of the beams' measured size and divergence. However, higher-order spatial modes are more various and, the complex amplitude of the electric field of each has more complex spatial dependence. Therefore, classification of higher-order spatial modes requires a more complex spatial analysis including, differentiation of the high-order spatial modes from each other. Measurement of the $M^2$ factor is insufficient.

Canonical systems and methods to classify higher-order spatial modes comprise indirect measurement of the complex amplitude of a light beam's electric field. Typically, the complex amplitude of a light beam is indirectly measured using interferometry or, holographic techniques via unconventional optical devices/elements. Such unconventional optical devices/elements must emulate the complex spatial dependencies of the complex amplitudes of the electric fields of higher-order spatial modes. Unconventional optical devices/elements include, liquid crystal or micro-mirror based spatial light modulators or, custom reflective, refractive or, diffractive optical elements (e.g. spiral phase plates, q-plate, fork diffraction grating, meta-material).

While arguably effective, interferometry or, complex holographic techniques via unconventional optical devices/elements may have prohibitive complexity, i.e., dependence on a light beam's alignment, size, wave front (e.g. curvature, etc.), polarization, and wavelength. Additionally, unconventional optical devices/elements may have prohibitive cost and efficacy. They require quality of fabrication that depends on how well the complex spatial dependencies of the complex amplitudes of the electric fields of higher-order spatial modes can be emulated.

SUMMARY

An advance in the art is made according to aspects of the present disclosure directed to improved systems, methods, and structures providing machine learning based classification of higher order spatial modes.

In sharp contrast to the prior art, systems, methods, and structures according to aspects of the present disclosure advantageously provides:

Classification of high-order spatial modes emitted from a multimode optical fiber does not require indirect measurement of the complex amplitude of a light beam's electric field using interferometry or, holographic techniques via unconventional optical devices/elements, which have prohibitive cost and efficacy;

Classification of high-order spatial modes emitted from a multimode optical fiber is not dependent on a light beam's alignment, size, wave front (e.g. curvature, etc.), polarization, or wavelength, which has prohibitive cost and efficacy;

Classification of higher-order spatial modes from a multimode optical fiber does not require a prohibitive amount of experimentally generated training examples, which, in turn, has prohibitive efficacy; and The light beam from a multimode optical fiber can be advantageously separated into two orthogonal polarization components, such that, the different linear combination of higher order spatial modes comprising each polarization component can be classified.

BRIEF DESCRIPTION OF THE DRAWING

A more complete understanding of the present disclosure may be realized by reference to the accompanying drawing in which:

FIG. 1 shows a series of cross-sectional views of a multimode optical fiber having a circular geometry (1110);

a ring-like geometry (1120); an elliptical geometry (1130), and a multicore geometry (1140) according to aspects of the present disclosure;

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that United States Patent Application Publication US2015/0292941 entitled "Modal Decomposition of a Laser Beam," describes a system and method to classify higher-order spatial modes that uses holographic techniques via an unconventional optical device namely, a spatial light modulator. A light beam of interest illuminates a display of the spatial light modulator. The spatial light modulator displays a hologram corresponding to a spatial mode or spatial modes. The hologram modulates the complex amplitude of the electric field of the light beam. Then, the light beam undergoes a Fourier transform upon focusing through the effect of a lens. The higher-order spatial mode that the light beam is can be classified by detecting the power of the transformed light beam.

While apparently effective, the system and method disclosed therein requires the use of an unconventional optical device, i.e., a spatial light modulator. Additionally, this system and method is dependent on the light beam's alignment, size, wave front (e.g. curvature, etc.), polarization, and wavelength. If the alignment, size, wave front (e.g. curvature, etc.), polarization, and wavelength are not what is required by the spatial light modulator or, its displayed hologram, the light beam may be classified as the incorrect spatial mode.

United States Patent Application Publication US2017/0010463 describes a "Device for processing light/optical radiation, method and system for designing such a device." As another example, the system and method disclosed therein classifies higher-order spatial modes, where multiple custom reflective optical elements comprising a cavity are used. Operationally, a light beam is directed into a cavity and reflected back and forth off included elements. After a sufficient number of reflections, the light beam exits the cavity. Reflective surfaces of the elements are made such that they modify the complex amplitude of the electric field of the light beam. After exiting the cavity, the higher-order spatial mode characterizes the light beam may be classified by detecting the power of the modified light beam.

While apparently effective, this system and method requires the use of custom reflective optical elements and, is dependent on the light beam's alignment, size, wave front (e.g. curvature, etc.), polarization, and wavelength. As with other prior art systems and methods, if the alignment, size, wave front (e.g. curvature, etc.), polarization, and wavelength are not that required by the cavity or, its custom reflective optical elements, the light beam may not reflect off of the elements properly, and the light beam's complex electric field amplitude may not be modified properly. In turn, the light beam may be classified as an incorrect higher-order spatial mode.

United States Patent Application Publication US2018/0262291A1 entitled "Method for free space optical communication utilizing patterned light and convolutional neural networks", describes yet another method to classify higher-order spatial modes, where a light beam is incident to an image capturing device, which captures an image of the transverse spatial dependence of the intensity of a light beam. Then captured image of the transverse spatial dependence of the intensity of the light beam is classified using a neural network.

While apparently effective, this system and method are dependent on the light beam's alignment and size. For example, a type of neural network referred to as a convolutional neural network can have a network layer referred to as pooling. Pooling depends on the sizes of the kernel (i.e., the convolutional filter) and, the stride (i.e., the pixel interval that the kernel is translated between subsequent convolutions) that are used. Effectively, a convolution neural network that uses a pooling layer is sensitive to variations of size and alignment of a few pixels. As such, the light beam may be classified as an incorrect higher-order spatial mode when it is misaligned by only a few pixels.

Additionally, this system and method require the neural network to be trained by experimentally acquiring training examples. Experimentally acquired training examples comprise experimentally captured images of the transverse, spatial dependencies of the intensities of higher-order spatial modes. For example, for a convolutional neural network, 1000s of experimentally captured images are required for each higher-order spatial mode that requires classification.

As such, the use of experimentally captured training examples may be prohibitive.

Finally, this system and method cannot easily classify the higher-order spatial modes of a light beam from a multimode optical fiber because, a light beam from a multimode optical fiber has a complex electric field amplitude that has two orthogonal polarization components, where the complex electric field amplitude of each polarization component is a linear combination of higher-order spatial modes. As such, the complex electric field amplitude of each polarization component must be classified separately.

Given these and other infirmities in the prior art with respect to determining high-order spatial modes, an advance in the art is made according to aspects of the present disclosure in which an image capture device captures image data of the transverse, spatial dependencies of the intensities of two orthogonal polarization components of a light beam emitted from a multimode optical fiber. The light beam's alignment, size, and wave front vary with respect to the image capture device. Through the effect of polarization optical elements, the transverse, spatial dependencies of the intensities of the of at least two orthogonal polarization components of the light beam are separated and captured separately by the image capture device as image data.

Using a classifier, a processor classifies the image data of the transverse, spatial dependencies of the intensities of the at least two orthogonal polarization components of the light beam emitted from the multimode optical fiber, whose alignment, size, and wave front vary with respect to the image capture device. The classifier is trained off-line using synthesized training examples of higher-order spatial modes, comprising varying alignments, sizes, and wave fronts.

As will be appreciated by those skilled in the art and in sharp contrast to prior art systems and methods for higher-order spatial mode determination, systems, methods and structures according to aspects of the present disclosure provide:

- Classification of high-order spatial modes emitted from a multimode optical fiber does not require indirect measurement of the complex amplitude of a light beam's electric field using interferometry or, holographic techniques via unconventional optical devices/elements, which have prohibitive cost and efficacy;
- Classification of high-order spatial modes emitted from a multimode optical fiber is not dependent on a light beam's alignment, size, wave front (e.g. curvature, etc.), polarization, or wavelength, which has prohibitive cost and efficacy;
- Classification of higher-order spatial modes from a multimode optical fiber does not require a prohibitive amount of experimentally generated training examples, which, in turn, has prohibitive efficacy; and
- The light beam from a multimode optical fiber can be advantageously separated into two orthogonal polarization components, such that, the different linear combination of higher order spatial modes comprising each polarization component can be classified separately.

Figure 3:
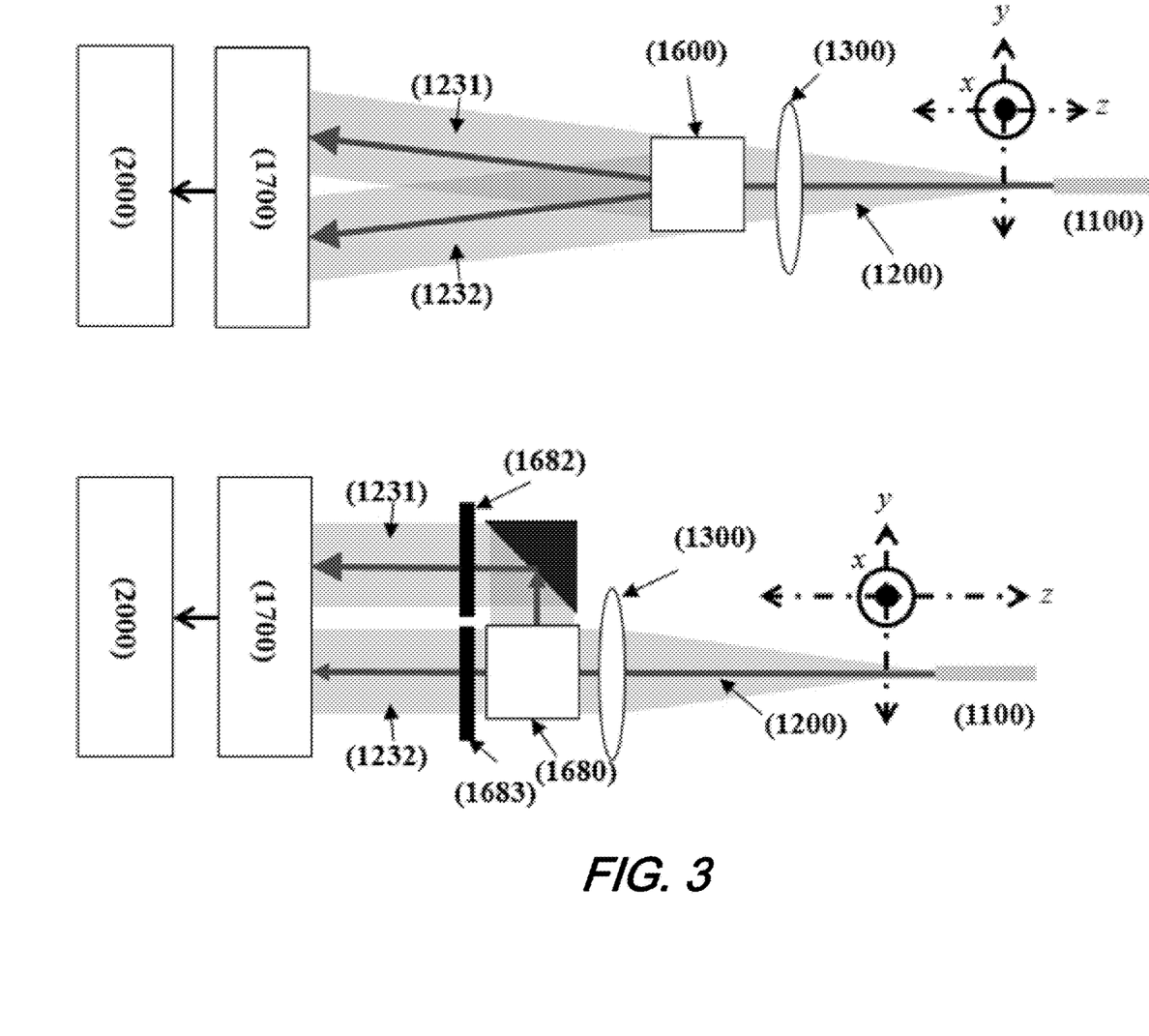
FIG. 3 is a schematic diagram illustrating two illustrative arrangements for determining high-order spatial modes according to aspects of the present disclosure.

With simultaneous reference now to FIGS. 1-5 it may be observed that an image capture device such as that schematically illustrated in FIG. 3 (top—illustrative configuration 1, bottom—illustrative configuration 2) captures image data of the transverse, spatial dependencies of the intensities of the of two orthogonal polarization components of a light beam from a multimode optical fiber 1100. The light beam's alignment, size, and wave front vary with respect to the image capture device. Using polarization optical elements, the transverse, spatial dependencies of the intensities of the at least two orthogonal polarization components of the light beam are separated and captured separately by the image capture device.

In operation, the multimode optical fiber supports N higher-order spatial modes, where N=1, 2, . . . . The transverse cross section of the optical fiber comprises regions that have indices of refraction, given by $n_2$ and $n_1$, referred to as the core and the cladding, respectively. $n_2$ and $n_1$ may be a function of the transverse spatial coordinates, given by (x, y), i.e., $n_2(x, y)$ and $n_1(x, y)$ As shown schematically in FIG. 1, the multimode optical fiber core may have a circular geometry 1110, a ring-like geometry 1120, or an elliptical geometry 1130 or a multicore geometry 1140.

The light beam emitted from the multimode optical fiber 1200 has a complex electric field amplitude that has two orthogonal polarization components, where the complex electric field amplitude of each polarization component is a linear combination of higher-order spatial modes, given by the equation:

$$\vec{u}(x, y) = \sum_{m=0}^{m=\infty} \sum_{n=0}^{n=\infty} c_{m,n}^x HG_{m,n}^x(x, y)\vec{x} + c_{m,n}^y HG_{m,n}^y(x, y)\vec{y}, \quad (1)$$

$$u^x(x, y) = \sum_{m=0}^{m=\infty} \sum_{n=0}^{n=\infty} c_{m,n}^x HG_{m,n}^x(x, y), \quad (1a)$$

$$u^y(x, y) = \sum_{m=0}^{m=\infty} \sum_{n=0}^{n=\infty} c_{m,n}^y HG_{m,n}^y(x, y), \quad (1b)$$

where the light beam is propagating in the z-direction and, (x, y) are rectangular coordinates. In Equation 1, Hermite-Gaussian modes are used to describe high-order spatial modes. However, other higher-order spatial modes can also be used, e.g. Laguerre-Gaussian modes, "linear polarized mode," "vector modes," etc.

As those skilled in the art will readily understand and appreciate, higher-order spatial modes are mathematical functions that describe the transverse spatial dependence of the complex amplitude of a light beam, as shown above. The mathematical functions are solutions to an electromagnetic wave equation. Advantageously, the electromagnetic wave equation can take into account the boundary conditions of an optical fiber. For example, the Helmholtz wave equation is given by:

$$\nabla^2(x, y)\vec{u}(x, y) + k^2 \vec{u}(x, y) = 0, \quad (2)$$

where $\nabla(x, y)$ is a gradient in rectangular coordinates and, $k=2\pi/\lambda$, where $\lambda$ is the light beam's wavelength.

Hermite-Gaussian modes 1211 such as those shown in FIG. 2 are higher-order spatial modes that are solutions to a wave equation in rectangular coordinates. Hermite-Gaussian modes are given by the equation:

$$HG_{m,n}(x, y) = c_{m,n} H_m\left(\frac{x\sqrt{2}}{w}\right) H_n\left(\frac{y\sqrt{2}}{w}\right) \exp\left(\frac{-x^2 - y^2}{w^2}\right), \quad (3)$$

where $H_m( \ldots )$ and $H_n( \ldots )$ are Hermite polynomials, w is the waist size of the higher-order spatial modes, $c_{m,n}$ are complex coefficients, and m,n=0, 1, 2, . . . .

The transverse, spatial dependencies of the intensities of Hermite-Gaussian modes are given by $|HG_{mn}(x, y)|^2$. As may be observed, the transverse, spatial dependencies of the intensities of $HG_{00}$, $HG_{00}$, $HG_{01}$, $HG_{10}$, $HG_{11}$, $HG_{02}$, $HG_{20}$ are shown in FIG. 2.

Laguerre-Gaussian modes 1212 such as those shown in FIG. 2, are higher-order spatial modes that are solutions to a wave equation in polar coordinates. Laguerre-Gaussian modes are given by:

$$LG_{l,p}(r, \theta) = c_{l,p} \exp\left(-\frac{r^2}{w^2}\right) \left(\frac{r\sqrt{2}}{w}\right)^{|l|} L_{l,p}\left(\frac{2r^2}{w^2}\right) \exp(il\theta), \quad (4)$$

where $(r, \theta)$ are polar coordinates, $L_{l,p}(\ldots)$ are generalized Laguerre polynomials, w is the waist size each spatial mode, $c_{l,p}$ are complex coefficients, and $l=0, \pm 1, \pm 2, \ldots$; $p=0, 1, 2, \ldots$.

The transverse, spatial dependencies of the intensities of Laguerre-Gaussian modes are given by $|LG_{l,p}(r, \theta)|^2$. The transverse, spatial dependencies of the intensities of $LG_{0,0}$, $LG_{0,+1}$, $LG_{0,-1}$, $LG_{0,+2}$, $LG_{0,-2}$ are shown in FIG. 2.

Note that higher-order spatial modes can also be "linearly polarized" modes, "vector" modes, or any other higher-order spatial modes that are solutions to the electromagnetic wave equation, which takes into account the boundary conditions of an optical fiber. Note further that $\vec{x}$ and $\vec{y}$ are the two orthogonal polarization components of the complex amplitude of the electric field of the light beam from the multimode optical fiber.

As will be understood, the at least two orthogonal polarization components can be:

Horizontal and vertical states of polarizations, e.g., they are oriented 0 and 90 degrees, respectively, with respect to the x-axis;

Diagonal and anti-diagonal states of polarizations, e.g., they are oriented 45 and 135 degrees, respectively, with respect to the x-axis; and Right circular and left circular states of polarizations.

The transverse, spatial dependence of the intensity of the light beam from the multimode optical fiber is given by the equation:

$$I(x, y) = |\vec{u}(x, y)|^2 \quad (5)$$

$$I^x(x, y) = |u^x(x, y)|^2 \quad (5a)$$

$$I^y(x, y) = |u^y(x, y)|^2 \quad (5b)$$

wherein $I^x(x, y)$ is the transverse, spatial dependence of the intensity of the $\vec{x}$ polarization component of the complex amplitude of the electric field of the light beam from the multimode optical fiber, as given by Equation 5a; $I^y(x, y)$ is the transverse, spatial dependence of the intensity of the $\vec{y}$ polarization component of the complex amplitude of the electric field of the light beam from the multimode optical fiber, given by Equation 5b.

As illustrated in FIG. 3 in both illustrative configurations, the image capture device 1300 may advantageously comprise no lenses, a single lens or, a combination of multiple lenses. The optical fiber 1100 is not placed at the individual focal planes or, the effective focal planes of the single lens or, combination of multiple lenses, where the wave front of the light beam acquires aberration (e.g. curvature), given by Equation 7, as it propagates through the single lens or, combination of multiple lenses.

The image capture device captures the transverse, spatial dependence of the intensity of the $\vec{x}$ polarization component of the light beam from the multimode optical fiber, $I^x(x, y)$, given by Equation 5a.

The image capture device captures the transverse, spatial dependence of the intensity of the $\vec{y}$ polarization component of the light beam from the multimode optical fiber, $I^y(x, y)$, given by Equation 5b.

The image capture device captures the transverse, spatial dependence of the intensity of the transverse, spatial dependence of the intensity of the diagonal, $\vec{d} = (\vec{x} + \vec{y})/\sqrt{2}$, polarization component of the light beam from the multimode optical fiber, $I^d(x, y)$, given by the Equation:

$$I^d(x, y) = |\vec{u}(x, y) \cdot \vec{d}|^2 \quad (5c)$$

The image capture device captures the transverse, spatial dependence of the intensity of the transverse, spatial dependence of the intensity of the anti-diagonal, $\vec{a} = (\vec{x} - \vec{y})/\sqrt{2}$, polarization component of the light beam from the multimode optical fiber, $I^a(x, y)$, given by the Equation:

$$I^a(x, y) = |\vec{u}(x, y) \cdot \vec{a}|^2 \quad (5d)$$

The image capture device captures the transverse, spatial dependence of the intensity of the transverse, spatial dependence of the intensity of the right-circular, $\vec{r} = (\vec{x} + i\vec{y})/\sqrt{2}$, polarization component of the light beam from the multimode optical fiber, $I^r(x, y)$, given by the Equation:

$$I^r(x, y) = |\vec{u}(x, y) \cdot \vec{r}|^2 \quad (5e)$$

Next, polarization optical elements 1600 separate the transverse, spatial dependencies of the intensities of the at least two orthogonal polarization components of the light beam from the multimode optical fiber 1231, 1232. In the illustrative configuration 1 shown in the upper portion of FIG. 3, such polarization optical elements may include: polarization beam splitters, such as: wire grid polarizing cube, Fresnel prism, Glan-Thompson prism, Wollaston prism, Meta material polarization beam splitter, Liquid crystal polarization beam splitter, or a pixelated polarization element where each pixel analyzes a different polarization As shown schematically in FIG. 3—illustrative configuration 2 shown in the lower portion of that figure, polarization optical elements can also include combinations of: A non-polarizing beam splitter 1680, a linear polarizer 1682 that analyzes the $\vec{x}$ polarization component of the light beam from the multimode optical fiber, a linear polarizer 1683 that analyzes the $\vec{y}$ polarization component of the light beam from the multimode optical fiber.

Figure 4:
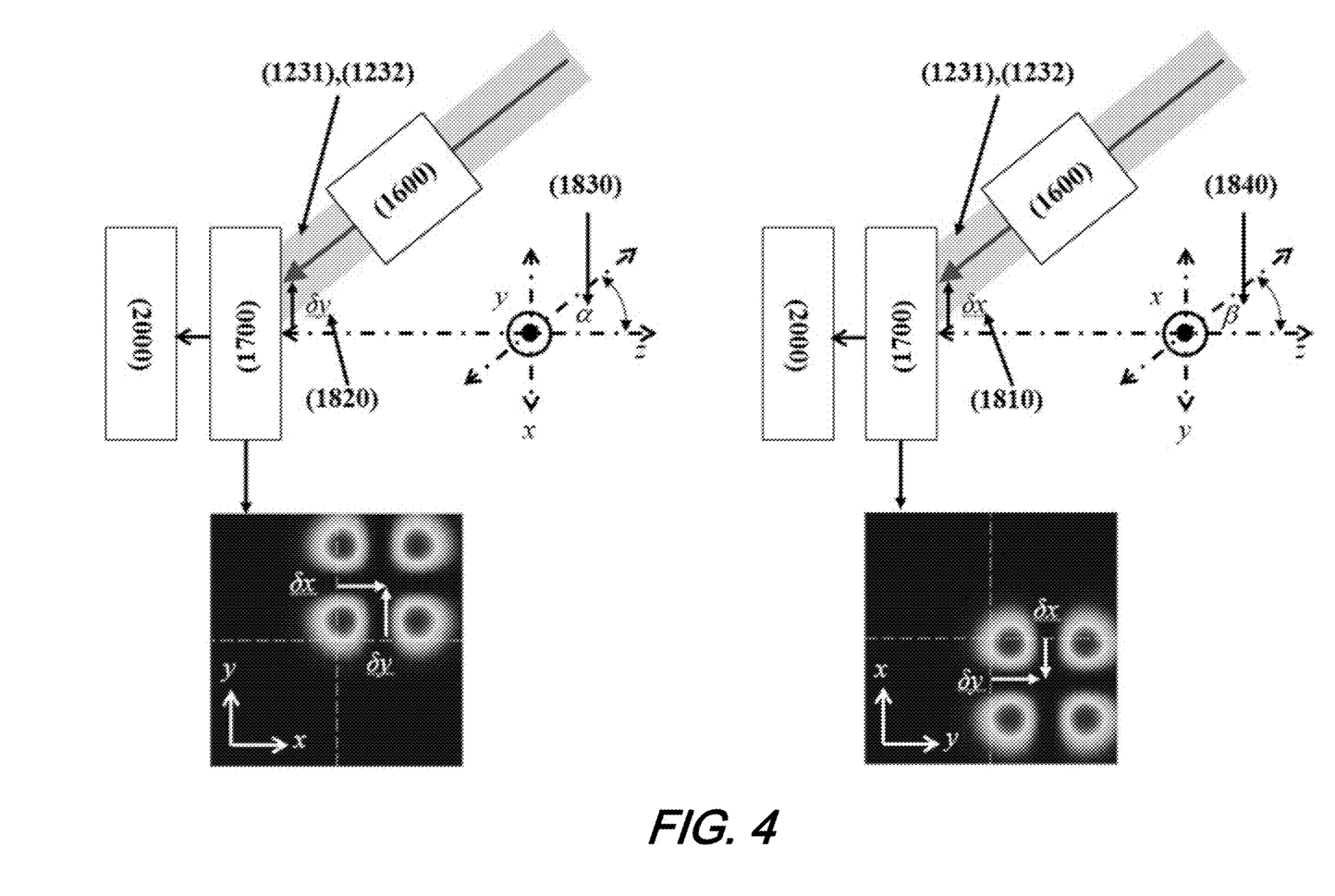
FIG. 4 is a schematic diagram illustrating an arrangement for an image capture structure for determining high-order spatial modes according to aspects of the present disclosure.
Figure 5:
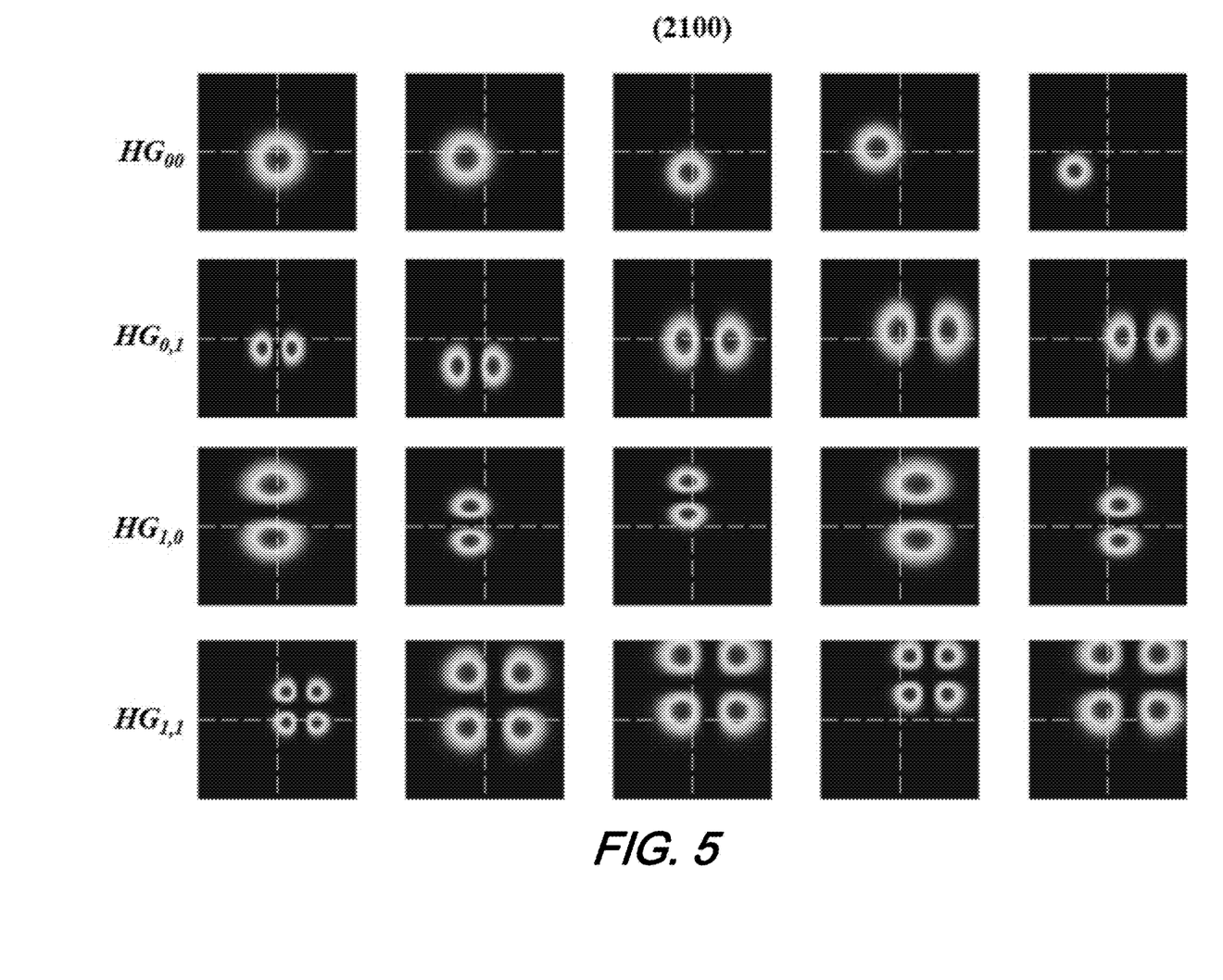
FIG. 5 is a series of higher order spatial modes including Hermite-Gaussian modes according to aspects of the present disclosure.

As may be observed in FIG. 4, the image capture device 1700 comprises a device that records digital images of the transverse, spatial dependencies of the intensities of the at least two orthogonal polarization components of the light beam from the multimode optical fiber, whose alignment, size, and wave front vary with respect to the image capture device.

In a illustrative embodiment, the device that records digital images of the transverse, spatial dependencies of the intensities of the at least two orthogonal polarization components of the light beam from the multimode optical fiber is a conventional pixelated camera.

The complex amplitude of the electric field of the light beam from the multimode optical fiber, whose alignment, size, and wave front vary with respect to the image capture device, is given by the equation:

$$\vec{u}'(x+\delta x, y+\delta y; w+\delta w) = \vec{u}(x+\delta x, y+\delta y; w+\delta w) \times \exp(i\phi(x+\delta x, y+\delta y; w+\delta w)), \quad (6)$$

where $\phi(x+\delta x, y+\delta y; w+\delta w)$ is the wave front of the light beam, which can be described as a linear combination of Zernike polynomials, given by the equation:

$$\phi(r', \theta'; w') = \qquad (7)$$

$$\sum_{m=0}^{m} A_{i,0} R_{i,0}(r'; w') + \sum_{i=1}^{\infty} \sum_{i=1}^{j} R_{i,j}(r'; w')\{A_{i,j}\cos(j\theta') + B_{i,j}\sin(j\theta')\},$$

$$r' = \left(\sqrt{(x+\delta x)^2 + (y+\delta y)^2}\right), \qquad (7a)$$

$$\theta' = \tan^{-1}\left(\frac{y+\delta y}{x+\delta x}\right), \qquad (7b)$$

$$w' = w + \delta w, \qquad (7c)$$

where $R_{i,j}(r'; w')$ is the radial Zernike polynomial, and $A_{i,j}$ and $B_{i,j}$ are coefficients, and $i,j=0, 1, 2, \ldots$.

The transverse, spatial dependencies of the intensities of the light beam from the multimode optical fiber and, that of its $\vec{x}$ polarization component and the $\vec{y}$ polarization component, whose alignment, size, and wave front (e.g. curvature, etc.) vary with respect to the image capture device, given by Equation 6, are given by the equations:

$$I(x+\delta x, y+\delta y; w+\delta w) = |\vec{u}(x+\delta x, y+\delta y; w+\delta w)|^2 \qquad (8)$$

$$I^x(x+\delta x, y+\delta y; w+\delta w) = |u^{x'}(x+\delta x, y+\delta y; w+\delta w)|^2 \qquad (8a)$$

$$I^y(x+\delta x, y+\delta y; w+\delta w) = |u^{y'}(x+\delta x, y+\delta y; w+\delta w)|^2 \qquad (8b)$$

As may be observed with reference to FIG. 4, the center of the light beam is displaced an amount given by δx 1810 in the x-direction with respect to the z-axis, the center of the light beam is displaced an amount given by δy 1820 in the y-direction with respect to the z-axis, the direction of propagation of the light beam makes an angle given by α 1830 in the y-z plane, and the direction of propagation of the light beam makes an angle given by β 1840 in the x-z plane.

The waist size of the light beam varies by an amount given by δw, and the wave front of the light beam has aberration, given by $\phi(x+\delta x, y+\delta y; w+\delta w)$, Equation 7.

Using a classifier 2000, a processor classifies the image data of the transverse, spatial dependencies of the intensities of the two orthogonal polarization components of the light beam from the multimode optical fiber, whose alignment, size, and wave front vary with respect to the image capture device. The classifier is trained off-line using synthesized training examples of higher-order spatial modes, comprising varying alignments, sizes, and wave fronts.

The synthesized training examples of higher-order spatial modes are numerically calculated, transverse, spatial dependencies of the intensities of higher-order spatial modes, whose alignment, size, and wave front vary with respect to the camera.

For example, the numerically calculated, transverse, spatial dependencies of the complex amplitudes of the electric fields and, the intensities of Hermite-Gaussian modes, whose alignment, size, and wave front vary with respect to the camera, are given by the equations, respectively:

$$HG_{m,n}(x+\delta x, y+\delta y; w+\delta w) = \qquad (9a)$$

$$c_{m,n} H_m\left(\frac{(x+\delta x)\sqrt{2}}{w+\delta w}\right) H_n\left(\frac{(y+\delta y)\sqrt{2}}{w+\delta w}\right) \exp\left(\frac{-(x+x\delta)^2 - (y+y\delta)^2}{(w+\delta w)^2}\right)$$

$$I_{m,n}(x+\delta x, y+\delta y; w+\delta w) = |HG_{m,n}(x+\delta x, y+\delta y; w+\delta w)|^2, \qquad (9b)$$

For example, the numerically calculate, transverse, spatial dependencies of the complex amplitudes of the electric fields and, the intensities of Laguerre-Gaussian modes, whose alignment, size, and wave front vary with respect to the camera, are given by the equations, respectively:

$$LG_{l,p}(r', \theta', w+\delta w) = \qquad (10a)$$

$$c_{l,p} \exp\left(-\frac{(r')^2}{(w+\delta w)^2}\right)\left(\frac{(r')\sqrt{2}}{w+\delta w}\right)^{|l|} L_{l,p}\left(\frac{2(r')^2}{(w+\delta w)^2}\right)\exp(il\theta'),$$

$$I_{l,p}(x+\delta x, y+\delta y; w+\delta w) = |LG_{l,p}(r', \theta'; w+\delta w)|^2. \qquad (10b)$$

The numerically calculated transverse, spatial dependencies of the intensities of higher-order spatial modes are displaced an amount given by δx in the x-direction with respect to the z-axis.

The numerically calculated transverse, spatial dependencies of the intensities of higher-order spatial modes are displaced an amount given by δy in the y-direction with respect to the z-axis. The numerically calculated transverse, spatial dependencies of the intensities of higher-order spatial modes have waist sizes that vary by an amount given by: δw. The classifier that classifies the image data that is captured by the image capture device of the transverse, spatial dependencies of the intensities of the two orthogonal polarization components of the light beam from the multimode optical fiber, whose alignment, size, and wave front vary with respect to the image capture device is one selected from the group consisting of: Convolutional neural network and Support vector machine.

The numerically calculated transverse, spatial dependencies of the intensities of higher-order spatial modes are of the $\vec{x}$ polarization component of the light beam from the multimode optical fiber.

The numerically calculated transverse, spatial dependencies of the intensities of higher-order spatial modes are of the $\vec{y}$ polarization component of the light beam from the multimode optical fiber.

The numerically calculated transverse, spatial dependencies of the intensities of higher-order spatial modes are of the $\vec{d}$ polarization component of the light beam from the multimode optical fiber.

The numerically calculated transverse, spatial dependencies of the intensities of higher-order spatial modes are of the $\vec{a}$ polarization component of the light beam from the multimode optical fiber.

The numerically calculated transverse, spatial dependencies of the intensities of higher-order spatial modes are of the $\vec{r}$ polarization component of the light beam from the multimode optical fiber.

The numerically calculated transverse, spatial dependencies of the intensities of higher-order spatial modes are of the $\vec{l}$ polarization component of the light beam from the multimode optical fiber.

The numerically calculated transverse, spatial dependencies of higher-order spatial modes are given by the set of Stokes parameters:

$$S_0 = I^r(x+\delta x, y+\delta y; w+\delta w) + I^l(x+\delta x, y+\delta y; w+\delta w) \quad (12a)$$

$$S_1 = I^r(x+\delta x, y+\delta y; w+\delta w) - I^l(x+\delta x, y+\delta y; w+\delta w) \quad (12b)$$

$$S_2 = I^d(x+\delta x, y+\delta y; w+\delta w) - I^a(x+\delta x, y+\delta y; w+\delta w) \quad (12c)$$

$$S_3 = I^r(x+\delta x, y+\delta y; w+\delta w) - I^l(x+\delta x, y+\delta y; w+\delta w) \quad (12d)$$

At this point, while we have presented this disclosure using some specific examples, those skilled in the art will recognize that our teachings are not so limited. Accordingly, this disclosure should be only limited by the scope of the claims attached hereto.

The invention claimed is:

1. An improved method for classifying higher order spatial modes of light comprising:
   outputting the light from a multimode optical fiber said light including two orthogonal polarization components each having a linear combination of higher-order spatial modes;
   separating the two orthogonal polarization components into at least two light beams;
   generating, then recording processed or unprocessed digital images of the light beams, whose size, alignment and wave front vary with respect to the recording device; and
   classifying, using a machine learning based classifier, the higher order spatial modes of the light.

2. The improved method of claim 1 wherein the separating of the at least two orthogonal polarization components is performed by polarization optical components of the improved system.

3. The improved method of claim 2 wherein the multimode optical fiber core is one selected from the group consisting of: circular core, ring-core, elliptical core, and multicore.

4. The improved method of claim 3 wherein the higher order-spatial modes are Laguerre-Gaussian modes.

5. The improved method of claim 3 wherein the higher order-spatial modes are Hermite Gaussian modes.

6. The improved method of claim 3 wherein the higher order-spatial modes are Linearly Polarized modes.

7. The improved method of claim 3 wherein the higher order spatial modes are vector modes.

8. The improved method of claim 4 wherein the at least two orthogonal polarization components of the light exhibit an orientation selected from the group consisting of: horizontal/vertical, diagonal/antidiagonal, and right/left circular.

9. The improved method of claim 1 wherein the digital images are made with a camera and the multimode optical fiber and the camera are not positioned at a focal region of lenses comprising optical components of the system.

10. The improved system of claim 1 wherein the digital images include transverse, spatial dependencies of the intensities of the at least two orthogonal polarization components of the light beam whose alignment, size, and wave front vary with respect to a camera configured to generate the digital images.

11. The improved method of claim 1 wherein the digital images are processed to be Stokes parameters.

12. The improved method of claim 1 wherein the recorded digital images are of the transverse spatial dependencies of the intensities of the at least two orthogonal polarization components of the light beam and are classified using a machine learning based classifier that is trained using numerically calculated training examples, said examples comprising varying alignments, sizes, and wave fronts.

13. The improved method of claim 8 wherein the numerical calculated higher order spatial modes are displaced in at least one of an x-direction and a y-direction.

14. The improved system of claim 12 wherein the numerically calculated higher order spatial modes exhibit varying waist(s).

15. The improved system of claim 12 wherein the numerically calculated training examples are Stokes parameters of the higher order spatial modes.

16. The improved method of claim 12 wherein the numerically calculated training examples are labelled by a combination of the amplitudes, phases, and/or powers of the higher-order spatial modes in the linear combination of spatial modes.

17. The improved method of claim 1 wherein the machine learning based classifier is a convolutional neural network.

18. The improved method of claim 17 wherein a fully connected layer of the convolutional neural network corresponds to a combination of the amplitudes, phases, and/or powers of the higher-order spatial modes in the linear combination of spatial modes.

19. The improved method of claim 18 wherein the convolutional neural network is trained using a loss function which compares the values of a fully connected layer and a combination of amplitudes, phases, and/or powers of the higher-order spatial modes in the linear combination of spatial modes.

20. The improved method of claim 19 wherein the input to the convolutional neural network is the Stokes parameters or the intensity images of the at least two polarization components.

* * * * *